Patented May 23, 1950

2,509,055

UNITED STATES PATENT OFFICE 2,509,055

FRACTIONATION OF MIXTURES OF PENI-
CILLINS CONTAINING PENICILLIN-K

Morris A. Dolliver, Stelton, and Charles Glaser,
Raritan, N. J., assignors to E. R. Squibb & Sons,
New York, N. Y., a corporation of New York No Drawing. Application July 2, 1946,
Serial No. 681,142

5 Claims. (Cl. 260—302)

This invention relates to the potent antibiotics known as "penicillins."

In 1929, Fleming discovered that a strain of a Penicillium mold growing in ordinary nutrient broth formed a powerful antibacterial substance, which he named "penicillin" (Brit. J. Exptl. Path. 10, 226-36); and this name was also used to designate the product obtained by Florey and his associates at the University of Oxford and shown by them to be a clinically-useful chemotherapeutic agent (Lancet 241, 177, 1941).

Since that time, it has been established that there are several penicillins, i. e., several antibiotics of the penicillin class. All of these antibiotics have the empirical formula $C_9H_{11}O_4SN_2 \cdot R$; R being $\Delta^2$-pentenyl in penicillin-F, benzyl in penicillin-G, p-hydroxy-benzyl in penicillin-X, and n-heptyl in penicillin-K.

Also, it has been found that more than one penicillin may be (and usually is) formed in the same culture, and that the proportions of the penicillins formed may vary with changes in the conditions of the culture, i. e., may vary from batch to batch. The mixtures of penicillins (e. g., the commercial penicillins) obtained by the usual partial purification treatments are highly useful chemotherapeutic agents; but in view of the indications that the antibiotic spectra of the various penicillins are not identical (cf. the "differential ratio" referred to hereinafter), fractionation of these mixtures has become desirable. Penicillin mixtures have been fractionated heretofore, and the various penicillins have even been isolated in pure form, but the procedures employed were, in general, complex and inefficient.

It is the object of this invention to provide simple, efficient, and otherwise advantageous methods of fractionating mixtures of penicillins containing penicillin-K.

The methods of this invention essentially comprise intimately contacting an aqueous solution of a mixture of (alkaline-earth-metal)-penicillins containing (alkaline-earth-metal)-penicillin-K with a water-immiscible organic solvent of the group consisting of alkyl halides (especially chloroform), aliphatic esters (especially amyl acetate), aromatic hydrocarbons (especially benzene), and aliphatic ketones, (especially methyl isobutyl ketone); separating the three layers formed; and separately recovering (or further fractionating) the alkaline-earth-metal)-penicillin in each of said layers. Preferably, the mixture treated is a mixture of calcium-penicillins comprising calcium-penicillin-K, and the solvent employed is chloroform.

The (alkaline-earth-metal)-penicillin may be recovered directly from each layer by freeze-drying. Preferably, the recovery from the oily intermediate layer is effected by suspending it in water, intimately contacting the suspension with a water-immiscible organic solvent which does not form an oil with an (alkaline-earth-metal)-penicillin, inter alia, aliphatic ethers (e. g., diethyl ether) and aliphatic hydrocarbons (e. g., hexane), separating the aqueous layer formed, and recovering the (alkaline-earth-metal)-penicillin in said aqueous layer, e. g., by freeze-drying.

The fractionation may be effected when forming the alkaline-earth-metal salt from a mixture of acid-penicillins containing acid-penicillin-K, e. g., by converting the acid-penicillins into alkaline-earth-metal salts in the presence of water and a water-immiscible organic solvent of the (intermediate-oily-layer-forming) group specified hereinbefore, separating the layers formed, and separately recovering the (alkaline-earth-metal)-penicillin in each of the layers.

The recovered alkaline-earth-metal salts—especially the calcium salts—may be used as chemotherapeutic agents without further purification; or the salts may be further purified and/or converted into purified—especially crystalline—salts of the group consisting of sodium- and ammonium-penicillin.

The penicillin content of the layers formed may either be re-fractionated by the same treatment, or recovered directly. Thus, the aqueous layer may be intimately contacted with another portion of the organic solvent, the resulting three layers separated, and the oily-intermediate and organic-solvent layers either combined with the corresponding original layers or separately treated to recover the penicillin therein; and the penicillin may be recovered from the original or final aqueous layer directly, as by freeze-drying. As a further alternative, the original or combined organic-solvent layer may be used for the treatment of the next batch of mixed penicillins to be fractionated (replacing part of the organic solvent).

The following examples are illustrative of this invention (the "unit" referred to being the Florey, or Oxford, unit used in the United States of America for standardizing therapeutic penicillin preparations; the identification of the strains of Penicillium notatum being that given by the Northern Regional Research Laboratory at Peoria, Illinois and the "differential ratio" referred to being the ratio of the potency as determined against *Bacillus subtilis* to the potency as determined against *Staphylococcus aureus*):

Example 1

(a) A medium of the formula:
265 gals. corn steep liquor
66.5 lbs. $KH_2PO_4$
33 lbs. $MgSO_4.7H_2O$
664 lbs. lactose C. P.
640 lbs. $CaCO_3$
25 gals. soybean oil
12.75 oz. $ZnSO_4$
1.5 gals. lard oil
5.75 lbs. octadecanol
83 lbs. wheat bran made up to 8,000 gals. with tap water, is placed in a tank equipped with a stirrer and a sparger for introduction of air; the medium is then sterilized; an inoculum of *Penicillium notatum* (strain No.152) is added; and the medium is incubated at 25–26° C. while maintained under an air pressure of about 15 lbs./sq. in., with air passing into the medium through the sparger. The tank is harvested after six and one-half days' incubation, and the culture liquid is separated from the mold by centrifugation.

(b) The culture liquid is acidified with 20% phosphoric acid to pH 2.2, and extracted with amyl acetate while cooling; the amyl-acetate solution is extracted with 0.2 volume of a 2% pH 6.5 phosphate-buffer solution; the buffer solution is acidified with 20% phosphoric acid to pH 2.2, and extracted with 0.5 volume of chloroform; the chloroform solution is extracted with 0.5 volume of a 2% pH 6.5 phosphate-buffer solution; and the cooled buffer solution is acidified with 20% phosphoric acid to pH 2.2 and extracted with 0.7 volume of ether.

(c) Four gallons of the ether solution is stirred at 0° C. with 250 g. anhydrous sodium sulfate; 150 g. of an activated charcoal is added, the mixture stirred 15 minutes and then filtered; and the filtrate is washed with two 65 ml. portions of saturated sodium chloride solution, and then with 65 ml. portions of water until the washings are free of phosphates and sulfates and contain no more than a trace of chlorides.

(d) 300 ml. water is added to the treated ether solution obtained as described in the preceding section, and freshly-prepared "milk of lime" (containing 1.2 gram moles available calcium hydroxide per liter) is added in small portions with vigorous stirring until the pH of the aqueous phase reaches 6.8, and the aqueous layer formed (an aqueous solution of calcium-penicillin) is separated. [A sample of the solution gives on freeze-drying a calcium-penicillin having a potency of 677 units/mg., a differential ratio of 0.52, and a calcium content of 7.59%.]

(e) 18.99 liters of the aqueous solution of calcium-penicillin is stirred with 0.5 volume chloroform. The resulting mixture resolves itself into three layers, a chloroform layer at the bottom, an oily intermediate layer, and an aqueous layer at the top. The three layers are separated, and the aqueous layer is given two more treatments each with 0.25 volume chloroform; and the chloroform and oily-intermediate layers obtained in each of these treatments are combined with the corresponding original layers, leaving a final aqueous layer. The (combined) oily intermediate layer has a volume of 960 ml., a pH of 6.5, and contains about 434 million units penicillin. This oily material rapidly loses its penicillin activity, even on storage at 5° C., soon setting to a resinous-like mass; and when freshly prepared, it is difficultly soluble in water, phosphate-buffer solution (pH 6.9), sodium bicarbonate solution, and calcium hydroxide solution.

(f) 930 ml. of the (combined) oily intermediate layer is suspended in 2.5 liters of cold distilled water, and the suspension is stirred for five minutes in the cold with 6 liters of ether. The aqueous layer formed (having a volume of 3.2 liters and a pH of 6.6) is separated from the ether layer, and freeze-dried. The calcium-penicillin thus obtained in a yield of 319.5 g. has a potency of 1165 units/mg. (89% recovery), a differential ratio of 0.42, and a calcium content of 6.09%.

(g) 5 g. of the calcium-penicillin obtained as described in the preceding section is dissolved in 100 ml. distilled water at 5° C.; and the solution is covered with 200 ml. ether, and 5% hydrochloric acid is added while stirring and cooling until the pH of the aqueous phase reaches 2.5. The ether layer formed is separated and extracted with 2% sodium bicarbonate solution to a pH of 6.6; and the aqueous extract is separated and freeze-dried to yield 2.7 g. of a sodium-penicillin having a potency of 1060 units/mg. On crystallization of this sodium-penicillin from a mixture of moist ethyl acetate and acetone, 380 mg. of pure-white crystals is obtained; and after drying over phosphorus pentoxide at 100° C. and under a pressure of 2 mm. mercury, the crystalline sodium-penicillin has a potency of 2500 units/mg. and a differential ratio of 0.30. The product is essentially sodium-penicillin K; its analysis (C, 52.02%; H, 6.73%; N, 7.45%; Na, 6.52; and S, 9.01% agreeing with that calculated for $C_{16}H_{25}O_4N_2SNa$.

(g alternate) using 5% ammonium hydroxide solution in place of the sodium-bicarbonate solution in the preceding section, 3.8 g. ammonium-penicillin is obtained; and crystallization of the ammonium-penicillin from moist acetone yields 850 mg. white crystals having a potency of 2089 units/mg. and a differential ratio of 0.341.

[The (combined) chloroform layer described in section "e," having a volume of 19.5 liters and containing about 19 million units penicillin, is washed with 2 liters water in the cold, while maintaining the pH at 2.5 by addition of 5% hydrochloric acid (or other dilute mineral acid); the washed chloroform layer is then re-extracted with 2% aqueous sodium bicarbonate solution until the pH of the aqueous layer reaches 6.8; and the aqueous extract is separated and freeze-dried, yielding a sodium-penicillin having a potency of 650 units/mg. and a differential ratio of 0.61. The (final) aqueous layer described in section "e," having a volume of 17.8 liters and containing about 410 million units penicillin, is freeze-dried to yield a calcium-penicillin having a potency of 675 units/mg., a differential ratio of 0.57, and a calcium content of 8.02%.]

Example 2

(a) The culture liquid described in section "a" of Example 1 is acidified with 20% phosphoric acid to pH 2.2, and extracted with amyl-acetate while cooling; the amyl-acetate solution is extracted with 0.2 volume of a 2% pH 6.5 phosphate-buffer solution; and the buffer solution is acidified with 20% phosphoric acid to pH 2.2, and extracted with 0.5 volume of chloroform. The chloroform solution is shaken with anhydrous sodium sulfate (15 g./liter) for 15 minutes; an activated charcoal (5 g./liter) is added; and the mixture is thoroughly agitated and then filtered.

(b) The treated chloroform solution of penicillin (containing 16 million units) is extracted with "milk of lime" until the pH of the extract reaches 6.5. The resulting mixture resolves itself into three layers, a chloroform layer at the bottom, an oily intermediate layer, and an aqueous layer at the top; and the layers are separated. The oily intermediate layer, containing 945,000 units of penicillin and having a differential ratio of 0.55, is suspended in water, and the suspension is intimately mixed with ether; and the aqueous layer formed is separated and freeze-dried, yielding a calcium-penicillin having a potency of 1,000 units/mg.

The calcium-penicillin thus obtained may be converted into crystalline sodium- or ammonium-penicillin as described in sections "g" and "g alternate" of Example 1.

[The chloroform layer is treated as described in the preceding Example for recovery of the penicillin content thereof. The aqueous layer (of the three layers), containing about 1,716,000 units penicillin, is freeze-dried, yielding a calcium-penicillin having a potency of 720 units/mg. and a differential ratio of 0.98 (indicative of a high content of penicillin-G).]

Example 3

(a) 245 ml. of an aqueous sodium-penicillin solution having a potency of 25,500 units/ml. (obtained from the ether solution described in section "b" of Example 1, by extraction with 2% aqueous sodium-bicarbonate solution) is cooled to 5° C., and intimately mixed with 600 ml. ether while adding 5% hydrochloric acid solution until the pH of the aqueous layer becomes 2.5. The ether solution of acid-penicillin formed is separated, dried over anhydrous sodium sulfate, treated wtih an activated charcoal, and filtered. 50 ml. water is added to the ether solution; and while maintaining the temperature at 5° C. and stirring, "milk of lime" is added until the aqueous phase has a pH of 8.1. The aqueous phase is separated, and the pH thereof is adjusted to 6.8 with 5% hydrochloric acid; and the solution is filtered, yielding 54 ml. of an aqueous solution of calcium-penicillin having a potency of 78,000 units/ml. [On freeze-drying 25 ml. of this solution, a calcium-penicillin having a potency of 295 units/mg. and a differential ratio of 0.83 is obtained.]

(b) 29 ml. of the aqueous solution of calcium-penicillin is intimately mixed with 10 ml. chloroform. The resulting mixture resolves itself into three layers, a chloroform layer at the bottom, an oily intermediate layer, and an aqueous layer at the top. The three layers are separated, and the aqueous layer is given two more treatments, each with a 10 ml. portion of chloroform; and the chloroform and oily intermediate layers obtained on each of these treatments are combined with the corresponding original layers, leaving a final aqueous layer. The (combined) oily intermediate layer is suspended in water, and the suspension is intimately mixed with ether; and the aqueous layer formed is freeze-dried, yielding a calcium-penicillin having a potency of 444 units/mg. and a differential ratio of 0.55.

[The (combined) chloroform layer is treated as described in Example 1 for recovery of the penicillin content thereof. The (final) aqueous layer obtained, containing about 10% of the penicillin originally present, is freeze-dried to yield a calcium-penicillin having a potency of 121 units/mg. and a differential ratio of 0.79.]

Example 4

(a) 3.6 liters of an aqueous solution of sodium-penicillin containing about 67 million units penicillin (obtained from the ether solution described in section "b" of Example 1, by extraction with 2% aqueous sodium bicarbonate solution) is cooled to 5° C., and intimately mixed with 5.0 liters amyl acetate while adding 5% hydrochloric acid until the pH of the aqueous layer becomes 2.5. The amyl-acetate solution of acid-penicillin formed is separated, and intimately mixed with a suspension of 200 g. precipitated chalk in 1 liter water, while cooling. The resulting mixture resolves itself into three layers, an amyl acetate layer at the top, an oily intermediate layer, and an aqueous layer at the bottom; and the layers are separated. The oily intermediate layer is freeze-dried, yielding 10.5 g. of a calcium-penicillin having a potency of 1225 units/mg.

(b) 5 g. of the calcium-penicillin is converted into ammonium-penicillin as described in section "g alternate" of Example 1. The ammonium salt, obtained in a yield of 3.3 g., has a potency of 943 units/mg. Crystallization of 1 g. of said salt from moist acetone yields 207 mg. white crystals having a potency of 1851 units/mg. and a differential ratio of 0.37.

[The amyl-acetate layer, containing about 4 million units penicillin, is washed with 1 liter water maintained at pH 2.5 with 5% aqueous hydrochloric acid, and then extracted with 2% sodium bicarbonate solution until the pH of the extract reaches 6.8. The aqueous extract is then removed and freeze-dried, yielding a sodium-penicillin having a potency of 580 units/mg. The aqueous layer is freeze-dried, yielding 33 g. of calcium-pencillin having a potency of 612 units/mg.]

The invention may be variously otherwise embodied within the scope of the appended claims.

We claim:

1. The method which essentially comprises intimately contacting an aqueous solution of a mixture of calcium-penicillins containing calcium-penicillin-K with a member of the group consisting of chloroform and amyl acetate, and separating the only intermediate layer formed.

2. The method which essentially comprises intimately contacting an aqueous solution of a mixture of calcium-penicillins containing calcium-penicillin-K with chloroform, and separating the oily intermediate layer formed.

3. The method which essentially comprises intimately contacting an aqueous solution of a mixture of calcium-penicillins containing calcium-penicillin-K with chloroform, separating the oily intermediate layer formed, suspending said layer in water, intimately contacting the suspension with ether, and separating the aqueous layer formed.

4. The method which essentially comprises treating a mixture of acid-penicillins containing acid-penicillin-K with a member of the group consisting of calcium hydroxide and calcium carbonate in the presence of water and a member of the group consisting of chloroform and amyl acetate, and separating the oily intermediate layer formed.

5. The method which comprises intimately contacting an aqueous solution of a mixture of calcium-penicillins containing calcium-penicillin-K with chloroform, separating the oily intermediate layer formed, suspending said layer in water, intimately contacting the suspension with ether, separating the aqueous layer formed, and freeze-drying said aqueous layer.

MORRIS A. DOLLIVER.
CHARLES GLASER.

REFERENCES CITED

The following references are of record in the file of this patent:

UNITED STATES PATENTS

| Number | Name | Date |
|---|---|---|
| 2,399,840 | Wachtel | May 7, 1946 |

FOREIGN PATENTS

| Number | Country | Date |
|---|---|---|
| 558,320 | Great Britain | Dec. 31, 1943 |

OTHER REFERENCES

Abraham; British J. of Experimental Pathology, vol. 23, June 1942, pp. 103-115.

British Report 42, p. 1, April 5, 1944.

British Report CMR Br 42, May 4, 1944 (CPS-61) (page 1).

Cutter Report CMR Cu-1, pp. 18 to 28 and 34, June 15, 1944.

British Report 98, pp. 3 and 4, Aug. 14, 1944.

Abbot Reports O. S. R. D. A. 16, Dec. 15, 1944, pages 1, 2.

Abbot Report A 17, Jan. 15, 1945, pp. 3 and 4.

Abbot Report A 18, pp. 7-10.

Cutter Report CMR Cu-4, page 11, Feb. 1, 1945.

Science, vol. 104, July 1946, pp. 84 and 85.